(12) United States Patent
Yang et al.

(10) Patent No.: US 8,457,947 B2
(45) Date of Patent: Jun. 4, 2013

(54) HYBRID TRANSLATION APPARATUS AND METHOD THEREOF

(75) Inventors: Seong Il Yang, Daejeon (KR); Young Kil Kim, Daejeon (KR); Chang Hyun Kim, Daejeon (KR); Oh Woog Kwon, Daejeon (KR); Yun Jin, Daejeon (KR); Eun Jin Park, Daejeon (KR); Young Ae Seo, Daejeon (KR); Sung Kwon Choi, Daejeon (KR); Jinxia Huang, Daejeon (KR); Yoon Hyung Roh, Daejeon (KR); Ying Shun Wu, Daejeon (KR); Ki Young Lee, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 716 days.

(21) Appl. No.: 12/651,533

(22) Filed: Jan. 4, 2010

(65) Prior Publication Data
US 2011/0131032 A1   Jun. 2, 2011

(30) Foreign Application Priority Data
Dec. 2, 2009 (KR) .......................... 10-2009-0118671

(51) Int. Cl.
*G06F 17/28* (2006.01)
(52) U.S. Cl.
USPC .......................................................... 704/4
(58) Field of Classification Search
USPC .......................................................... 704/4
See application file for complete search history.

(56) References Cited

U.S. PATENT DOCUMENTS

| 7,333,927 | B2 * | 2/2008 | Lee et al. ........................ 704/4 |
| 7,747,427 | B2 * | 6/2010 | Lee et al. ........................ 704/2 |
| 8,108,202 | B2 * | 1/2012 | Kwon et al. ..................... 704/2 |
| 8,121,829 | B2 * | 2/2012 | Hwang et al. ................... 704/4 |
| 8,219,382 | B2 * | 7/2012 | Kim et al. ....................... 704/2 |

FOREIGN PATENT DOCUMENTS

| JP | 8-263499 | 10/1996 |
| JP | 2007-47976 | 2/2007 |
| KR | 10-2005-0027298 | 3/2005 |
| KR | 10-2008-0019126 | 3/2008 |
| KR | 10-2009-0066067 | 6/2009 |

* cited by examiner

*Primary Examiner* — Susan McFadden
(74) *Attorney, Agent, or Firm* — Staas & Halsey LLP

(57) ABSTRACT

A hybrid translation apparatus includes a source language input unit for generalizing an input source language sentence for each node; a statistics-based translation knowledge database(DB) for storing learning data generalized for each node to be acquired; a first translation result generating unit for transforming the source language sentence generalized for each node into a node expression using the statistics-based translation knowledge to generate a first translation result; and a second translation result generating unit for repeatedly performing the generation of a target word for each node on the first translation result using pattern-based knowledge to generate a second translation result as target words for the respective nodes. Further, the hybrid translation apparatus includes a pattern-based translation knowledge DB for using in the pattern-based translation; and a translation result combining unit for combining the first translation result and the second translation result to output a target language sentence.

14 Claims, 4 Drawing Sheets

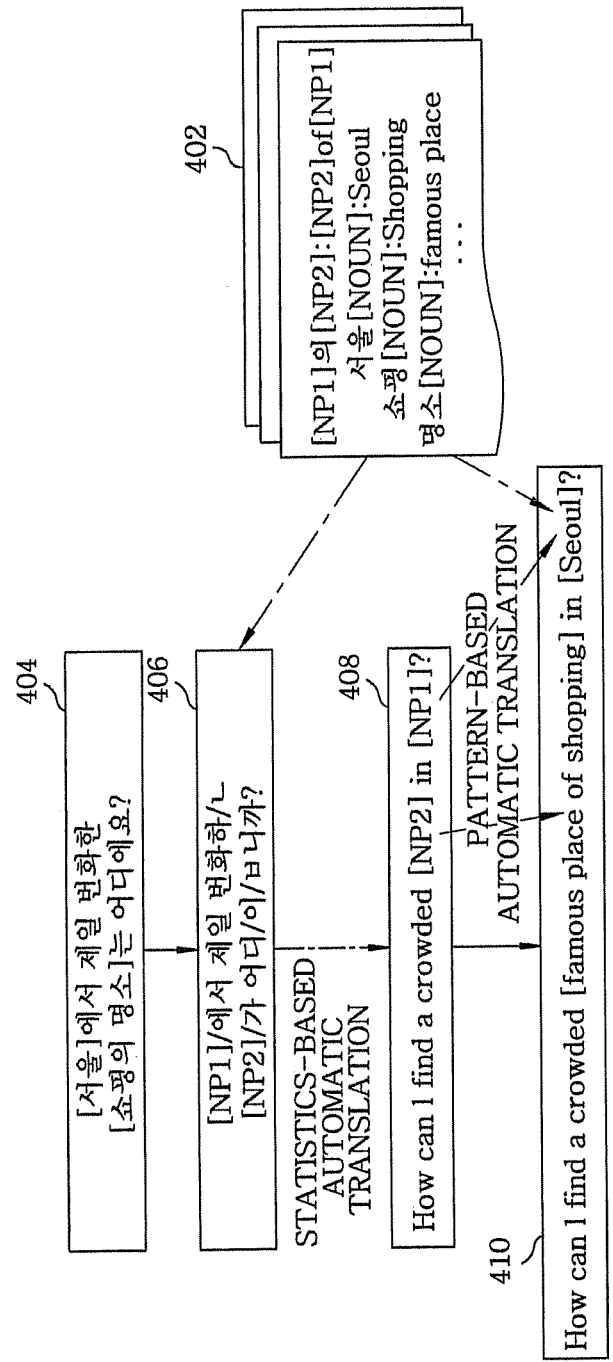

HYBRID TRANSLATION APPARATUS AND METHOD THEREOF

CROSS-REFERENCE TO RELATED APPLICATIONS

The present invention claims priority of Korean Patent Application No. 10-2009-0118671, filed on Dec. 02, 2009, which is incorporated herein by reference.

FIELD OF THE INVENTION

The present invention relates to a hybrid translation technique; and more particularly, to a hybrid translation apparatus and method, which are suitable for translating a source language sentence into a target language sentence using a hybrid technique including a statistical method and a pattern-based method.

BACKGROUND OF THE INVENTION

As well-known in the art, the statistical method of an automatic translation technique refers to a technique for solving the problem of translation ambiguity by automatically learning translation knowledge actually preferred by people through training data.

However, a parallel corpus used as learning data is utilized as lexicon-based sentence data. Thus, bilingual translation knowledge for transformation is relatively limited unless expressions formed by all combinations of words, which are substantially infinite, are constructed as learning data and applied. To statistically collect consistent tendencies of translation or learn the frequency of an expression, the learning of more than a certain amount of sentences using the corresponding expression is required.

Meanwhile, the pattern-based method can solve the data deficiency problem to a certain extent compared to a lexicon-based translation knowledge-based method by describing pattern data corresponding to a lexicon-based sentence to construct bilingual translation information thereof. However, there arises the problem of ambiguity of a translation result because a plurality of applicable patterns and translation knowledge can be generated.

As stated above, when automatic translation is performed using the statistics-based method or the pattern-based approach as the conventional automatic translation technique, each of the methods has a deficiency in solving the ambiguity of a translation result.

SUMMARY OF THE INVENTION

In view of the above, the present invention provides a hybrid translation apparatus and method, which is capable of outputting a target language sentence using each of translation results produced by processing an input source language sentence by a hybrid technique including a statistics-based method and a pattern-based approach.

In accordance with a first aspect of the present invention, there is provided a hybrid translation apparatus including: a source language input unit for generalizing an input source language sentence for each node; a statistics-based translation knowledge database(DB) for storing learning data generalized for each node to be acquired to utilize the learning data as transformation knowledge for statistics-based translation; a first translation result generating unit for transforming the source language sentence generalized for each node into a node expression using the statistics-based translation knowledge to generate a first translation result; a second translation result generating unit for repeatedly performing the generation of a target word for each node on the first translation result using pattern-based knowledge to generate a second translation result as target words for the respective nodes; a pattern-based translation knowledge DB for using in the pattern-based translation; and a translation result combining unit for combining the first translation result and the second translation result to output a target language sentence.

In accordance with a second aspect of the present invention, there is provided hybrid translation method including: generalizing an input source language sentence for each node; transforming the source language sentence generalized for each node into a node expression using statistics-based translation knowledge DB to generate a first translation result; store learning data generalized for each node to be acquired to utilize the learning data as transformation knowledge for statistics-based translation; repeatedly performing the generation of a target word for each node on the first translation result using pattern-based knowledge to generate a second translation result as target words for the respective nodes; and combining the first translation result and the second translation result to output a target language sentence.

In accordance with an embodiment of the present invention, it is possible to alleviate data scarcity arising in statistics-based translation and solve the problem of ambiguity arising in pattern-based translation by performing a hybrid technique including the statistics-based translation and the pattern-based translation, thereby improving the performance of an automatic translation system.

Further, the present invention provides a technique in which an input source language sentence is generalized to nodes, the source language sentence generalized to nodes is transformed into a node expression using statistics-based translation knowledge DB to generate a first translation result, the generation of a target word for each node is repeatedly performed on the first translation result using pattern-based translation knowledge, and then a target language sentence is output based on the first translation result and the second translation result. Accordingly, it is possible to solve the problems of the conventional techniques.

BRIEF DESCRIPTION OF THE DRAWINGS

The objects and features of the present invention will become apparent from the following description of embodiments, given in conjunction with the accompanying drawings, in which:

FIG. 4 is a view for explaining how to conduct translation using a hybrid technique including a statistics-based method and a pattern-based method in accordance with the embodiment of the present invention.

DETAILED DESCRIPTION OF THE EMBODIMENTS

Figure 1:
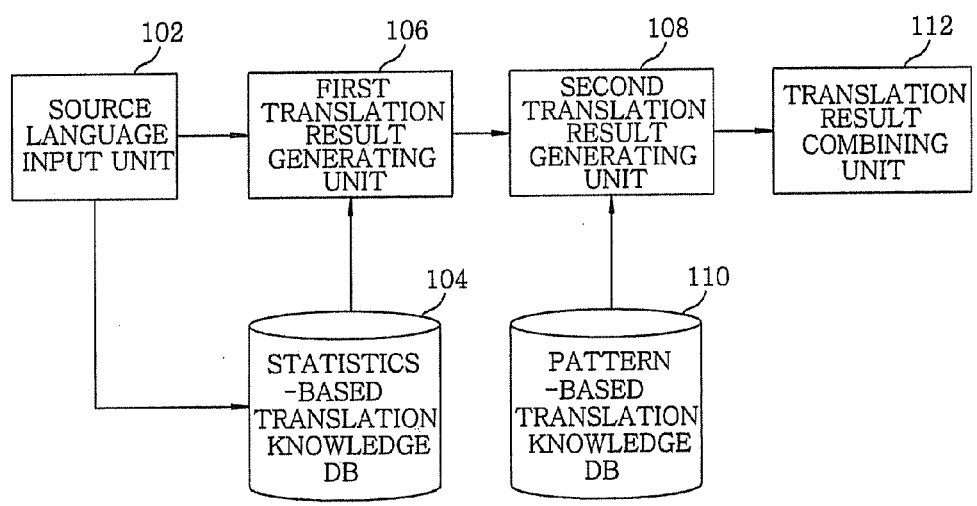
FIG. 1 illustrates a block diagram of a hybrid translation apparatus suitable for translating a source language sentence into a target language sentence on a statistical basis and a pattern basis in accordance with an embodiment of the present invention.

Before explaining the present invention, the terms used herein will be defined as follows:

First, an automatic translation system refers to a system that automatically translates an input sentence of a source language into a translated sentence of a target language using bilingual translation knowledge for translation;

Second, a language analysis system refers to a data processing system that analyzes linguistic internal expression information, such as the parts of speech, syntactic unit, syntactic structure, etc. of a natural language sentence, divides the elements of the sentence into units of analysis, and labels them with analysis information;

Third, a morphological analysis apparatus in the language analysis system refers to an analysis apparatus that parses the lexemes determining the headword of a lexicon of each of clauses constituting a sentence and the morphemes having part-of-speech information;

Fourth, a syntactic analysis apparatus in the language analysis system refers to an analysis apparatus that expresses the semantic connections between clauses of a sentence by directionality to identify the dependencies between the sentence elements;

Fifth, generalization for a node expression in the language analysis system refers to a procedure in which an analysis unit having the attributes of a noun is substituted into a given node form using analysis units and syntactic analysis units obtained by conducting morphological analysis on an input sentence. For instance, sentences "젊은이의 거리를 찾아요." and "음식점을 찾아요." can be generalized in the form of "[NP1]를 찾아요." by noun-based syntactic substitution, and functional words, such as "을/를", having different surface forms can be generalized in the representative form of a functional word commonly designated as "를";

Sixth, the statistical translation in the automatic translation system refers to an automatic translation technique which performs automatic translation using translation knowledge automatically learned from a parallel corpus. For instance, in case of sentences, such as "사랑하면 예뻐진다며?", "소설 속에서 사랑하는 연인들은..", "니가 사랑할 수 있는 사람을 찾으려면..", etc., where "사랑하다" appears, it can be found that the word "love" appears in corresponding English sentences with a higher frequency than those of any other words. Moreover, information about words or syntactic ranges (e.g., 사랑/사랑하 /사랑할_수_ 있는/에서_ 사랑하...) appearing with a relatively high frequency is collected based on the statistical relationship between an input sentence and a translated sentence to thus construct transformation information for each input and conduct automatic translation using this transformation information;

Seventh, a parallel corpus in the statistical translation method refers to a pair of sentences, one in a source language and the other in a target language, having the same meaning. That is, the parallel corpus means a set of data gathered by constructing and collecting a large amount of sentence pairs so as to be used as training data for statistical automatic translation;

Eighth, pattern-based translation in the automatic translation system refers to an automatic translation technique that uses pattern information described in syntactic units, along with a translation dictionary, as translation knowledge used for the transformation of a source language and a target sentence. For instance, automatic translation can be conducted by using a Korean text "학생의 질문" as bilingual translation knowledge for generating a translated sentence, such as "Questions of Student", based on a noun phrase translation pattern of the form of "[NP1] 의 [NP2]->[NP2] of [NP1]";

Ninth, a hybrid technique in the automatic translation system refers to a technique which can efficiently provide higher performance than that of the generation of a translation sentence using each automatic translation method by combining different automatic translation methods;

Tenth, the problem of data scarcity in the automatic translation system refers to a problem that, when there is no knowledge about the form of a target input sentence due to deficiency in translation knowledge used for automatic translation, it is not known how to transform a source text into a corresponding translation sentence; and Eleventh, the problem of ambiguity in the automatic translation system refers to a problem of selecting a correct answer from among a plurality of forms of translation sentences available for an input sentence. For instance, an expression "번화한 도시" can be translated in various ways, like "busy/crowded/famous . . . city", which means that a translation expression of the correct form can be found.

Hereinafter, embodiments of the present invention will be described in detail with reference to the accompanying drawings which form a part hereof.

FIG. 1 illustrates a block diagram of a hybrid translation apparatus which is suitable for translating a source language sentence into a target language sentence on a statistical basis and a pattern basis in accordance with an embodiment of the present invention. The hybrid translation apparatus shown in FIG. 1 includes a source language input unit 102, statistics-based translation knowledge database (DB) 104, first and second translation result generating units 106 and 108, pattern-based translation knowledge database (DB) 110, and a translation result combining unit 112.

Referring to FIG. 1, the source language input unit 102 establishes a database of the statistics-based translation knowledge DB 104, and inputs a source language sentence for each node. More specifically, the source language input unit 102 performs generic transformation for a node expression using all sentence pairs of a pre-constructed parallel corpus, and stores acquired learning data in the database of the statistics-based translation knowledge DB 104 to utilize the learning data as transformation knowledge for statistics-based translation.

Further, the first translation result generating unit 106 performs statistics-based translation using the pre-constructed statistics-based translation knowledge DB 104. Specifically, the first translation result generating unit 106 transforms the generated source language sentence for each node into a node expression using the pre-constructed statistics-based translation knowledge DB 104 to generate a first translation result in a target language.

Here, the statistics-based translation is a technique of performing automatic translation using translation knowledge learned from a parallel corpus. Information is collected based on the statistical relationship between an input sentence and a translated sentence to construct transformation information for each input, and then the statistics-based translation can be performed based on the transformation information.

The second translation result generating unit 108 performs pattern-based translation using the pre-constructed pattern-based translation knowledge DB 110. When the first translation result transformed into a node expression is provided, the generation of a target word for each node is repeatedly performed using the pattern-based translation knowledge DB 110 including, e.g., a bilingual dictionary, a translation pattern dictionary and the like until the translation of all nodes is complete, thereby generating a second translation result. Target words for the respective nodes of the second translation result generated in a repetitive manner are delivered to the translation result combining unit 112.

Here, the pattern-based translation is an automatic translation technique using a translation dictionary and pattern information described in syntactic units for the transformation of a source language and a translated sentence. For instance, a source language sentence can be automatically translated into a target language sentence by using a translation pattern dictionary including noun phrase translation patterns or the like, various kinds of bilingual dictionaries and on the like.

The translation result combining unit 112 outputs a target language sentence using the first translation result and the second translation result. A target word for each node generated by the second translation result generating unit 108 is inserted as a substitute to each node position of the first translation result transformed into a node expression by the first translation result generating unit 106, and then the connection of the sentence is refined, e.g., by generating articles in English to thus generate a target language sentence which is a translation result sentence.

Therefore, an input source language sentence is generalized to nodes, the source language sentence generalized to nodes is transformed into a node expression using statistics-based translation knowledge DB to thus generate a first translation result, the generation of a target word for each node is repeatedly performed on the first translation result using pattern-based translation knowledge, and then a target language sentence is output based on the first translation result and the second translation result. Thus, the problem of ambiguity of automatic translation can be solved by a hybrid technique using statistics-based translation knowledge DB and pattern-based translation knowledge.

Figure 2:
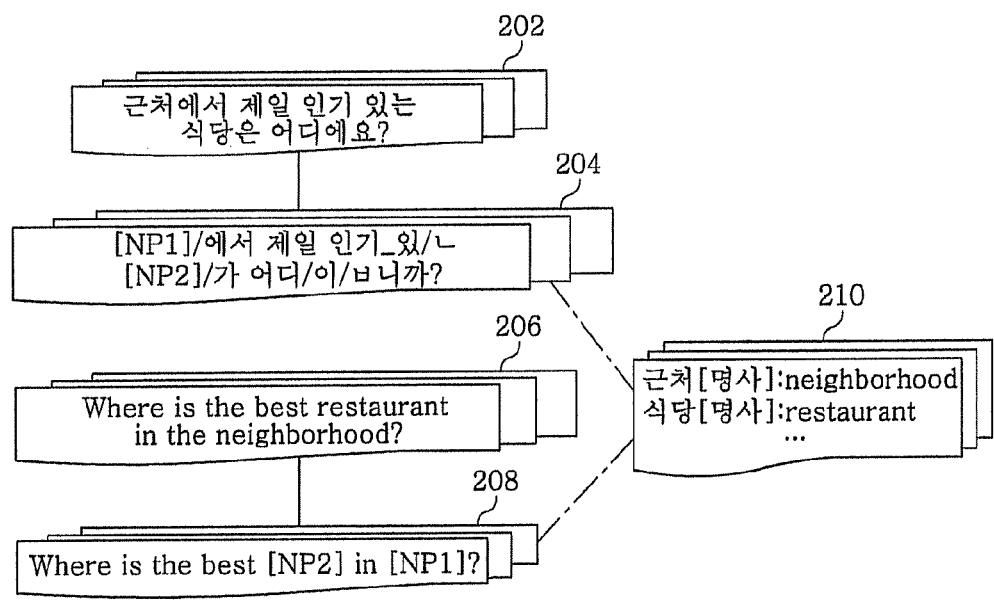
FIG. 2 shows a view for explaining the construction of statistics-based translation knowledge in accordance with the embodiment of the present invention.

FIG. 2 is a view for explaining how to establish statistics-based translation knowledge DB in accordance with an embodiment of the present invention, which illustrates the transformation of a learning data sentence with respect to a pair of sentences of a parallel corpus including a Korean sentence "근처에서 제일 인기 있는 식당은 어디에요?" and an English sentence "Where is the best restaurant in the neighborhood?".

Referring to FIG. 2, the Korean sentence 202 is data corresponding to an input sentence, and the English sentence 206 is data corresponding to an output sentence, and aligned information is learned in a statistical approach. To solve the problem of data ambiguity caused by lexicon-based learning, a Korean sentence node expression 204, which is transformed by generalization for a node expression using a language analysis technique, is generated.

Then, the position of a target node in the English sentence is determined based on each translation language information 210 of and '근처' and '식당', on which node transformation is performed using the transformed Korean sentence node expression 204, and thus, transformation of an English sentence expression into an English sentence node expression 208 is performed.

Based on such an English sentence node expression 208, internal transformation knowledge (i.e., statistics-based translation knowledge) is established as learning data for statistics-based translation using node expression sentences (i.e., the Korean sentence node expression 204 and the English sentence node expression 208), rather than lexicon-based sentences (i.e., the Korean sentence 202 and the English sentence 206), and thus, the established statistics-based translation knowledge can be used as transformation knowledge for performing the statistics-based translation.

Further, when a source language sentence is input in the form of text, the source language input unit 102 acquires syntactic information and a syntactic range for identifying the lexicon and part-of-speech for each morpheme to transform a translation node in the sentence by a language analysis technique, to generate a source language sentence for each node including the acquired syntactic information and syntactic range.

The following is a description of a procedure in which the hybrid translation apparatus having the configuration as above generalizes an input source language sentence to nodes, translates the source language sentence generalized to nodes into a node expression using statistics-based translation knowledge DB to generate a first translation result, repeatedly performs the generation of a target word for each node on the first translation result using pattern-based translation knowledge, and then outputs a target language sentence based on the first translation result and the second translation result.

Figure 3:
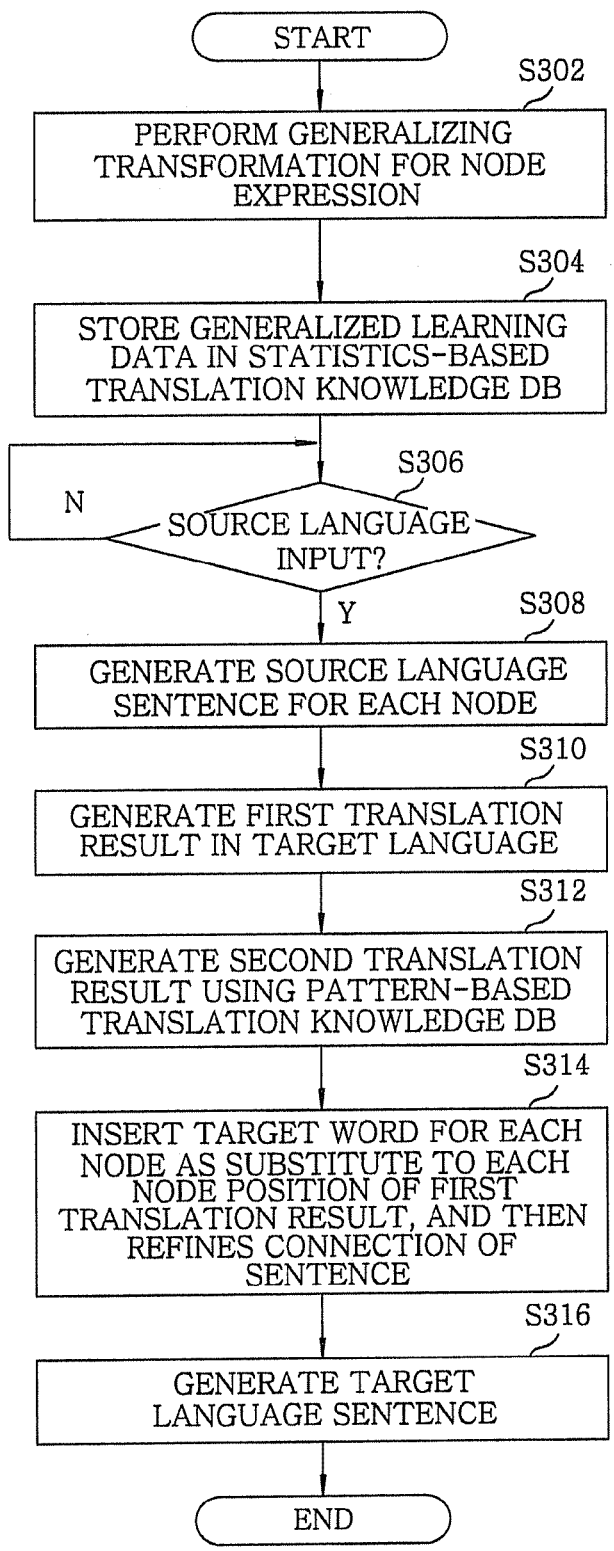
FIG. 3 illustrates a flow chart illustrating a procedure of translating a source language sentence into a target language sentence on a statistical basis and a pattern basis in accordance with the embodiment of the present invention.

FIG. 3 is a flow chart illustrating a procedure of translating a source language sentence into a target language sentence on a statistical basis and a pattern basis in accordance with an embodiment of the present invention.

Referring to FIG. 3, the source language input unit 102 performs generalizing transformation for a node expression using all sentence pairs of a pre-constructed parallel corpus in step S302, and stores thus acquired learning data in the statistics-based translation knowledge DB 104 to utilize the learning data as transformation knowledge for statistics-based translation in step S304.

For instance, as shown in FIG. 2, the Korean sentence node expression 204, which is transformed by generalization for a node expression using a language analysis technique, is generated. Then, the position of a target node in the English sentence is determined based on each translation language information 210 of '근처' and '식당', and on which node transformation is performed using the transformed Korean sentence node expression 204, and thus, transformation of an English sentence expression into an English sentence node expression 208 is performed. Based on such an English sentence node expression 208, internal transformation knowledge (i.e., statistics-based translation knowledge) is constructed using node expression sentences (i.e., the Korean sentence node expression 204 and the English sentence node expression 208), rather than lexicon-based sentences (i.e., the Korean sentence 202 and the English sentence 206), and thus, the statistic translation knowledge can be used as transformation knowledge for performing statistics-based translation.

Next, in step S306, the source language input unit 102 checks if a source language sentence in the form of text is inputted.

As a result of the checking in step S306, if the source language sentence is inputted, the source language input unit 102 acquires syntactic information and a syntactic range for identifying the lexicon and part-of-speech for each morpheme to transform a translation node in the sentence by language analysis, and generates a source language sentence for each node including the acquired syntactic information and syntactic range in step S308.

Next, in step S310, the first translation result generating unit 106 transforms the generated source language sentence for each node into a node expression using the pre-constructed statistics-based translation knowledge DB 104 to generate a first translation result including a target language.

Here, the statistics-based translation is a technique of performing automatic translation using translation knowledge learned from a parallel corpus. Information is collected based on the statistical relationship between an input sentence and a translation sentence to construct transformation information for each input, and then the statistics-based translation can be performed based on the transformation information.

Further, when the first translation result transformed into a node expression is provided, in step S312 the second translation result generating unit 108 repeatedly performs the generation of a target word for each node using the pattern-based translation knowledge DB 110 including, e.g., a bilingual dictionary, a translation pattern dictionary and the like until the translation of all nodes is complete, thereby generating a second translation result. Target words for the respective nodes of the second translation result generated in a repetitive manner are delivered to the translation result combining unit 112.

Here, the pattern-based translation is an automatic translation technique that uses a translation dictionary and pattern information described in syntactic units for the transformation of a source language and a translated sentence. For instance, a source language sentence can be automatically translated into a target language sentence by using a translation pattern dictionary containing noun phrase translation patterns or the like, various kinds of bilingual dictionaries and on the like.

Then, in steps S314 and S316, the translation result combining unit 112 inserts a target word for each node generated by the second translation result generating unit 108 as a substitute to each node position of the first translation result transformed into a node expression by the first translation result generating unit 106, and then refines the connection of the sentence by generating articles in English to thus generate a target language sentence which is a translation result sentence.

Therefore, an input source language sentence is generalized to nodes, the source language sentence generalized to nodes is transformed into a node expression using statistics-based translation knowledge DB to generate a first translation result, the generation of a target word for each node is repeatedly performed on the first translation result using pattern-based translation knowledge, and then a target language sentence is outputted based on the first translation result and the second translation result. Thus, a source language sentence can be automatically translated into a corresponding target language sentence.

FIG. 4 is a view for explaining how to conduct translation using a hybrid technique including a statistics-based method and a pattern-based method. For instance, FIG. 4 illustrates the generation of an English translation for a Korean sentence " 번화한 쇼핑의 명소는 어디에요?".

Referring to FIG. 4, a Korean input sentence 404 is generalized for a node expression by the source language input unit 102 and transformed into a node-based source language sentence 406. The node-based source language sentence 406 is in a form consistent with the format of the statistics-based translation knowledge DB 104 pre-constructed as training data for statistical translation. At this point, unlike the form of the training data, it can be seen that, in the input sentence, a noun phrase '쇼핑이 명소' is identified as one node expression, and this generalization for a node expression can solve the problem of data scarcity arising in statistical translation.

Further, when the node-based source language sentence 406 is input to the first translation result generating unit 106, a first translation result 408 is generated by performing statistics-based translation using the statistics-based translation knowledge DB 104. The first translation result 408 is a still incomplete translation result having a node expression therein. At this point, unlike the learned transformation knowledge as shown in FIG. 2, it can be seen that a translated English translation is changed to an English expression of the form of "How can I find ~", rather than the form of "Where is ~". This is a result of automatically learning a result of generation of an optimum translation for a currently input node expression while learning aligned information of expressions of a large amount of sentence pairs.

Next, the first translation result generating unit 106 performs pattern-based translation to generate target words of NP1 and NP2 in a node expression generated within the first translation result 408 based on a bilingual dictionary of Korean words obtained by conducting generalization for a node expression in the Korean input sentence and pattern information 402. The translation result combining unit 112 inserts a target word into each node position, and acquires a target language sentence 410 by refining the result sentence, e.g., by generating articles.

While the invention has been shown and described with respect to the particular embodiments, it will be understood by those skilled in the art that various changes and modification may be made without departing from the scope of the invention as defined in the following claims.

What is claimed is:

1. A hybrid translation apparatus comprising:
 a computer system, comprising:
  a source language input unit for generalizing an input source language sentence for each node;
  a statistics-based translation knowledge database(DB) for storing learning data generalized for each node to be acquired to utilize the learning data as transformation knowledge for statistics-based translation;
  a first translation result generating unit for transforming the source language sentence generalized for each node into a node expression using the statistics-based translation knowledge to generate a first translation result;
  a second translation result generating unit for repeatedly performing the generation of a target word for each node on the first translation result using pattern-based knowledge to generate a second translation result as target words for the respective nodes;
  a pattern-based translation knowledge DB for using in the pattern-based translation; and
  a translation result combining unit for combining the first translation result and the second translation result to output a target language sentence,
 wherein the source language input unit performs the generic transformation for a node expression using all sentence pairs of a pre-constructed parallel corpus, and stores acquired training data in a database of the statistics-based translation knowledge DB.

2. The apparatus of claim 1, wherein the source language input unit acquires syntactic information and a syntactic range for identifying the lexicon and part-of-speech for each morpheme in order to transform a translation node in the source language sentence by language analysis.

3. The apparatus of claim 1, wherein the first translation result generating unit collects translation information based on the statistical relationship between an input sentence and a translated sentence to generate the first translation result based on the statistics-based translation knowledge DB for each input.

4. The apparatus of claim 1, wherein the second translation result generating unit repeatedly performs the generation of a target word for each node using the pattern-based translation knowledge including a bilingual dictionary and a translation pattern dictionary until the translation of all nodes is complete.

5. The apparatus of claim 4, wherein the second translation result generating unit generates the second translation result using a translation dictionary and pattern information described in syntactic units for the transformation of a source language and a translated sentence.

6. The apparatus of claim 1, wherein the translation result combining unit performs combination by inserting a target word for each node based on the second translation result as a substitute to each node position of the first translation result.

7. The apparatus of claim 6, wherein the translation result combining unit generates the target language sentence by refining the connection of the sentence with respect to a combination result of the first translation result and the second translation result.

8. A hybrid translation method comprising:
generalizing an input source language sentence for each node;
transforming, using a computer, the source language sentence generalized for each node into a node expression using statistics-based translation knowledge DB to generate a first translation result;
store learning data generalized for each node to be acquired to utilize the learning data as transformation knowledge for statistics-based translation;
repeatedly performing the generation of a target word for each node on the first translation result using pattern-based knowledge to generate a second translation result as target words for the respective nodes; and
combining the first translation result and the second translation result to output a target language sentence,
wherein before said generalizing:
performing the generic transformation for a node expression using all sentence pairs of a pre-constructed parallel corpus, and storing acquired training data in a database of the statistics-based translation knowledge DB.

9. The method of claim 8, wherein said combining performs combination by inserting a target word for each node based on the second translation result as a substitute to each node position of the first translation result.

10. The method of claim 9, wherein said combining generates the target language sentence by refining the connection of the sentence with respect to a combination result of the first translation result and the second translation result.

11. The method of claim 8, wherein said generalizing acquires syntactic information and a syntactic range for identifying the lexicon and part-of-speech for each morpheme in order to transform a translation node in the source language sentence by language analysis.

12. The method of claim 8, wherein said transforming collects translation information based on the statistical relationship between an input sentence and a translated sentence to generate the first translation result based on the statistics-based translation knowledge DB for each input.

13. The method of claim 8, wherein said repeatedly performing repeatedly performs the generation of a target word for each node using the pattern-based translation knowledge including a bilingual dictionary and a translation pattern dictionary until the translation of all nodes is complete.

14. The method of claim 13, wherein said repeatedly performing generates the second translation result using a translation dictionary and pattern information described in syntactic units for the transformation of a source language and a translated sentence.

* * * * *